United States Patent [19]
Fisher et al.

[11] Patent Number: 5,829,289
[45] Date of Patent: *Nov. 3, 1998

[54] METHOD OF CONTROLLING A CRIMP PRESS FOR CRIMPING AN ASSEMBLY

[75] Inventors: John Harry Fisher, Novi; Douglas Parks Shelly, Grass Lake, both of Mich.

[73] Assignee: Ford Motor Company, Dearborn, Mich.

[*] Notice: The term of this patent shall not extend beyond the expiration date of Pat. No. 5,651,282.

[21] Appl. No.: 901,607

[22] Filed: Jul. 28, 1997

Related U.S. Application Data

[63] Continuation-in-part of Ser. No. 465,019, Jun. 5, 1995, Pat. No. 5,651,282.

[51] Int. Cl.$^6$ .......................................................... B21J 9/12
[52] U.S. Cl. ......................... 72/19.9; 72/21.5; 72/453.01; 29/753; 29/863
[58] Field of Search ...................................... 72/19.8, 19.9, 72/21.5, 30.1, 453.01, 389.3; 29/715, 753, 863

[56] References Cited

U.S. PATENT DOCUMENTS

| | | |
|---|---|---|
| 3,168,918 | 2/1965 | Smith . |
| 3,372,544 | 3/1968 | Kirkwood . |
| 3,662,450 | 5/1972 | Kish et al. . |
| 3,742,754 | 7/1973 | Jeromson, Jr. et al. . |
| 3,750,453 | 8/1973 | Dryden et al. . |
| 3,822,456 | 7/1974 | Petruzzi . |
| 4,116,122 | 9/1978 | Linder et al. . |
| 4,476,677 | 10/1984 | Hanshaw . |
| 4,914,602 | 4/1990 | Abe et al. . |
| 4,916,810 | 4/1990 | Yeomans . |
| 5,027,631 | 7/1991 | Naito ........................................ 72/21.5 |
| 5,031,431 | 7/1991 | Naito . |
| 5,113,679 | 5/1992 | Ferraro et al. ........................... 72/19.9 |
| 5,271,254 | 12/1993 | Gloe et al. . |
| 5,526,669 | 6/1996 | Gjovok et al. . |
| 5,651,282 | 7/1997 | Fischer ..................................... 72/19.9 |

*Primary Examiner*—David Jones
*Attorney, Agent, or Firm*—Raymond L. Coppiellie, Esq.; Roger L. May, Esq.

[57] ABSTRACT

A method of controlling a crimp press for crimping an assembly includes the steps of placing an assembly in an open crimp die of a crimp press, advancing a ram of the crimp press to a predetermined position to close the crimp die, determining whether a pressure in the ram is within a predetermined range, and alerting an operator if the pressure in the ram is not within the predetermined range.

17 Claims, 6 Drawing Sheets

METHOD OF CONTROLLING A CRIMP PRESS FOR CRIMPING AN ASSEMBLY

CROSS-REFERENCE TO RELATED APPLICATION(S)

The present application is a continuation-in-part of application Ser. No. 08/465,019, filed Jun. 5, 1995, now U.S. Pat. No. 5,651,282.

BACKGROUND OF THE INVENTION

1. Field of the Invention

The present invention relates generally to crimp presses and, more specifically, to a method of controlling a crimp press for crimping an assembly.

2. Description of the Related Art

It is known to provide a crimp press for crimping an assembly such as a hose assembly. Typically, the crimp press has a bed, ram and crimp die. The ram of the crimp press is reciprocally movable towards the bed to drive the crimp die together to contact and crimp a sleeve of a fitting onto a hose to form the hose assembly.

It is also known to use aluminum tubing for fittings on an air conditioning system of a motor vehicle. Although the aluminum tubing has worked well, it may be collapsed during crimping in the crimp press. The collapsed tubing may result in a weakened fitting and restricted fluid flow therethrough. To prevent the aluminum tubing from collapsing, a steel insert is typically disposed inside of the aluminum tubing prior to crimping. The steel insert helps maintain the internal diameter of the aluminum tubing. However, this steel insert results in added cost in parts and labor for the hose assembly. As a result, there is a need in the art to control the crimp press for crimping an assembly such as a hose assembly to maintain the internal diameter of the tubing and eliminate the need for the steel insert.

It is further known to provide a crimp press for crimping an assembly such as a radiator assembly. Typically, the crimp press has a bed, ram and crimp die. The ram of the crimp press is reciprocally movable towards the bed to drive the crimp die together to contact and crimp tabs on a header of a radiator core onto a plastic tank to form the radiator assembly. Although the crimp press has worked well, it may use increased pressure when crimping that can cause stress cracks in the plastic tanks, resulting in a possible leak in the plastic tank and radiator assembly. As a result, there is a need in the art to control the crimp press for crimping an assembly such as a radiator assembly to maintain the crimp within pressure limits and reduce the possibility of inducing stress cracks in the plastic tank.

SUMMARY OF THE INVENTION

Accordingly, the present invention is a method of controlling a crimp press for crimping an assembly. The method includes the steps of placing an assembly in an open crimp die of a crimp press, advancing a ram of the crimp press to a predetermined position to close the crimp die, determining whether the pressure in the ram is within a predetermined range, and alerting an operator if the pressure in the ram is not within the predetermined range.

One advantage of the present invention is that a method is provided of controlling a crimp press for crimping an assembly. Another advantage of the present invention is that the method provides predetermined controls and parameters for crimping with the crimp press that resists collapsing of or inducing stress cracks in the assembly. Yet another advantage of the present invention is that the method controls the linear motion and pressure of the ram of the crimp press with predetermined parameters rather than measuring the straining of rods. A further advantage of the present invention is that the method of crimping with predetermined controls and parameters allows an operator of the crimp press to know immediately if the crimp does not meet engineering specifications.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
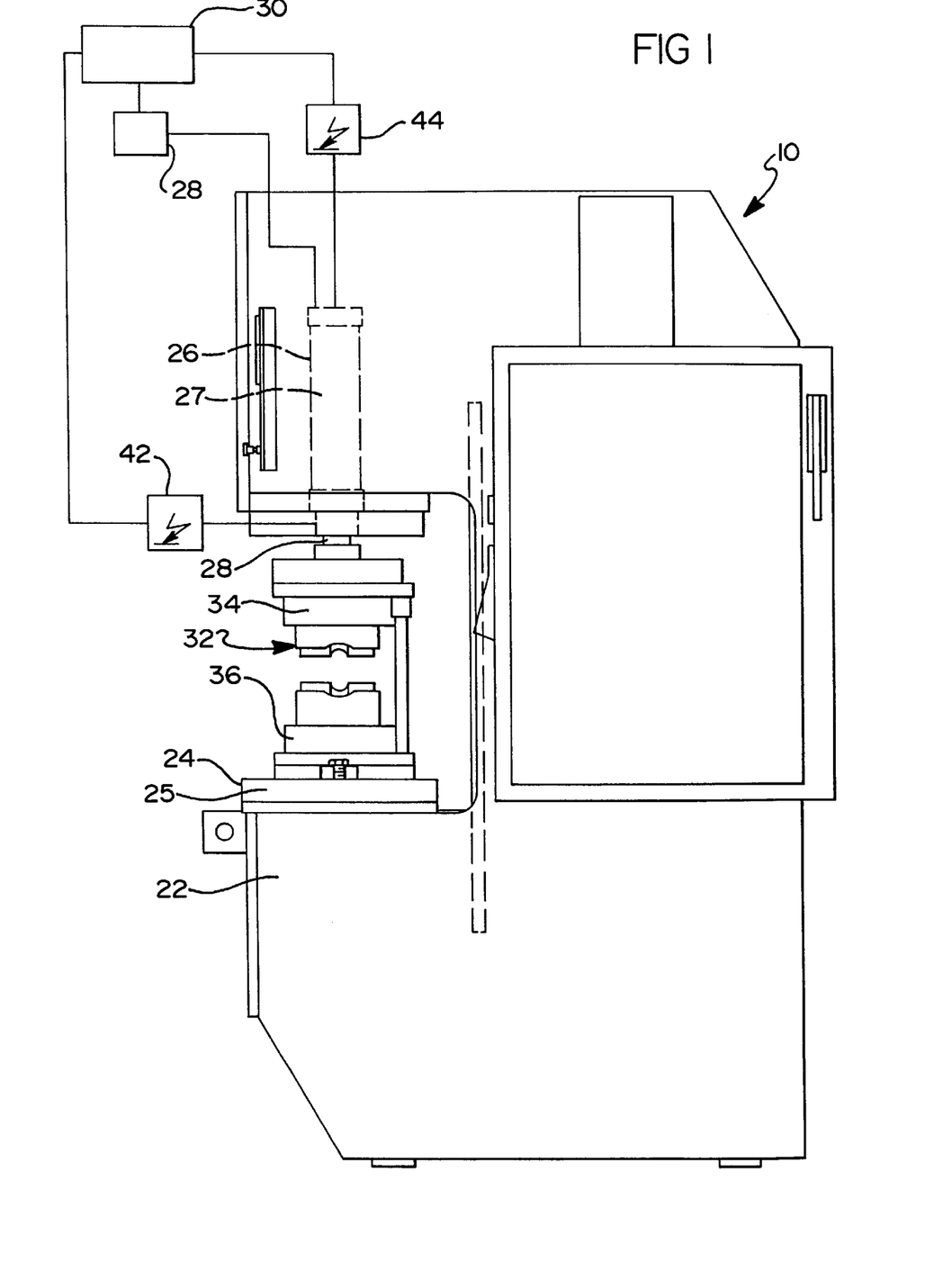
FIG. 1 is an elevational view of a crimp press.
Figure 2:
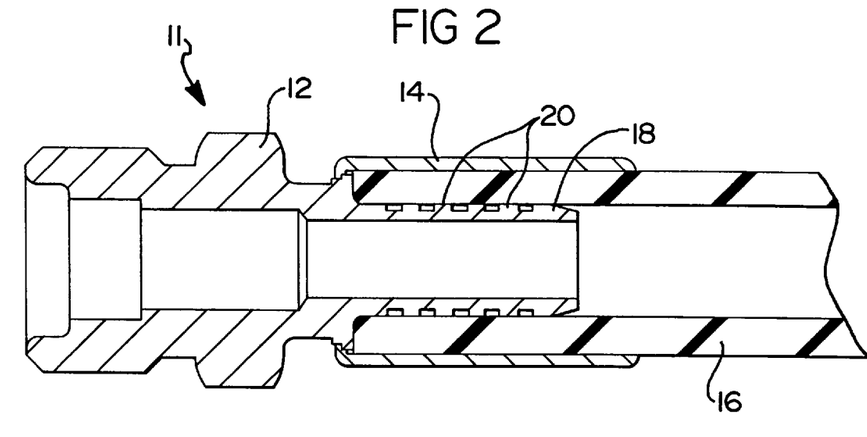
FIG. 2 is a fragmentary elevational view of an assembly such as a hose assembly prior to crimping in the crimp press of FIG. 1.

Referring to the drawings and in particular to FIG. 1, one embodiment of a crimp press 10 is shown for crimping an assembly such as a hose assembly, generally indicated at 11 in FIG. 2. The hose assembly 11, in this example, is used on an air conditioning system (not shown) of a motor vehicle (not shown). As defined in this application, the term "assembly" means a rigid member to flexible member to rigid member such as a fluid carrying assembly, a tank to header assembly, a heater core assembly, a brake line assembly, a power steering line assembly, a radiator assembly, a transmission oil cooler line assembly or hydraulic lines.

Figure 3:
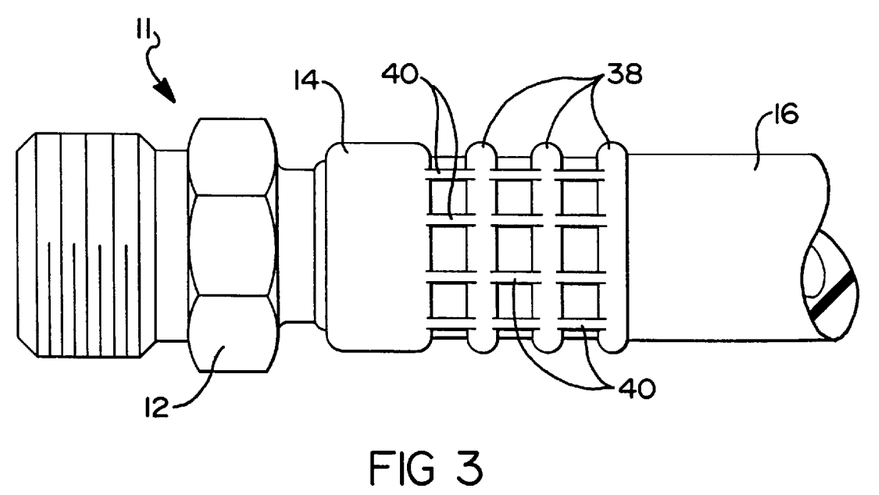
FIG. 3 is an elevational view of the hose assembly after crimping in the crimp press of FIG. 1.

Referring to FIGS. 2 and 3, the hose assembly 11 includes a couple or fitting 12, a ferrule or sleeve 14 and a hose 16. The fitting 12 is made of a rigid material such as metal, preferably aluminum or steel tubing, and has a generally cylindrical and axial projection 18. The projection 18 has at least one, preferably a plurality of barbs 20 spaced axially therealong. The sleeve 14 is also made of a rigid material such as metal, preferably aluminum or steel, and is generally cylindrical in shape. The sleeve 14 is secured to the fitting 12 by suitable means such as a bead lock to be radially spaced from and extended over the projection 18. The hose 16 is made of a flexible material such as an elastomer with a fiber core base. For example, the hose 16 may have a butyl cover over a braided fabric yarn over a nylon barrier as is known in the art. The hose 16 is disposed over the projection 18 and underneath the sleeve 14. It should be appreciated that the sleeve 14 is crimped to create an interference fit between the sleeve 14, hose 16 and projection 18. It should also be appreciated that the fitting 12 and hose 16 may be made of various suitable wall thickness and diameters.

The crimp press 10 includes a frame 22, bed 24 and ram 26. The bed 24 includes a bed plate 25 having a generally rectangular shape. The bed plate 25 is rigid and connected to the frame 22 by suitable means to form the bed 24 of the crimp press 10. The ram 26 includes a hydraulic cylinder 27 having a reciprocating piston (not shown) therein and a rod 28 connected to the piston. The hydraulic cylinder 27 is positioned above the bed plate 25 and connected to the frame 22 by suitable means to form the ram 26 of the crimp press 10. It should by appreciated that the ram 26 is operated by fluid pressure to be described.

The crimp press 10 also includes a hydraulic fluid system 28 fluidly connected to the ram 26. The hydraulic fluid system 28 includes a motor, pump, fluid reservoir, fluid cooler, and a plurality of solenoid-actuated valves (not shown) for controlling the fluid flow and pressure to the ram 26. The crimp press 10 includes an electronic control system 30 electronically connected to the motor of the pump and the solenoids of the solenoid-actuated valves. The electronic control system includes a controller, remote keypad and read-out (not shown). The electronic control system 30 and hydraulic fluid system 28 control the fluid pressure to the ram 26. For example, the fluid pressure to the ram 26 may be controlled to provide a rapid advance of approximately two hundred twelve (212) inches per minute (I.P.M.) and a pressing advance of seventy-nine (79) I.P.M. and a return stroke of three hundred fifty (350) I.P.M. Such a crimp press 10 is commercially available as a twenty (20) ton "C" frame gap press from DAKE of Grand Haven, Mich.

The crimp press 10 also includes a crimp die, generally indicated at 32, for crimping the hose assembly 11. The crimp die 32 includes an upper die 34 connected to one end of the rod 28 and a lower die 36 connected to the bed plate 25. Such a crimp die 32 is commercially available as a "S-1087" from LOMAR of Horton, Mich. When the crimp die 32 is open, the hose assembly 11 is placed in the lower die 36. The upper die 34 is moved by the ram 26 toward the lower die 36 to close the crimp die 32 and crimp the hose assembly 11 together as illustrated in FIG. 3. The crimp die 32 forms a crimp having a plurality of bubbles 38 and flats 40. It should be appreciated that the crimp die 32 may have any suitable type of crimp for crimping the hose assembly 11. It should also be appreciated that up to this point in the description, the crimp press 10 is conventional and known in the art.

The crimp press 10 further includes a pressure sensor or transducer 42 connected to the ram 26 and the electronic control system 30. The pressure transducer 42 senses or measures the fluid pressure in the ram 26 and sends a corresponding signal to the electronic control system 30. Such a pressure transducer 42 is commercially available from Dynisco of Sharon, Mass. The crimp press 10 also includes a linear sensor or transducer 44 connected to the ram 26 and the electronic control system 30. The linear transducer 44 senses or measures the linear distance of the ram 26 and sends a corresponding signal to the electronic control system 30. Such a linear transducer 44 is commercially available from Templesonics of Triangle Park, N.C. It should be appreciated that the pressure transducer 42 monitors the fluid pressure of the ram 26 and that the linear transducer 44 monitors the linear movement of the piston of the ram 26.

Figure 4:
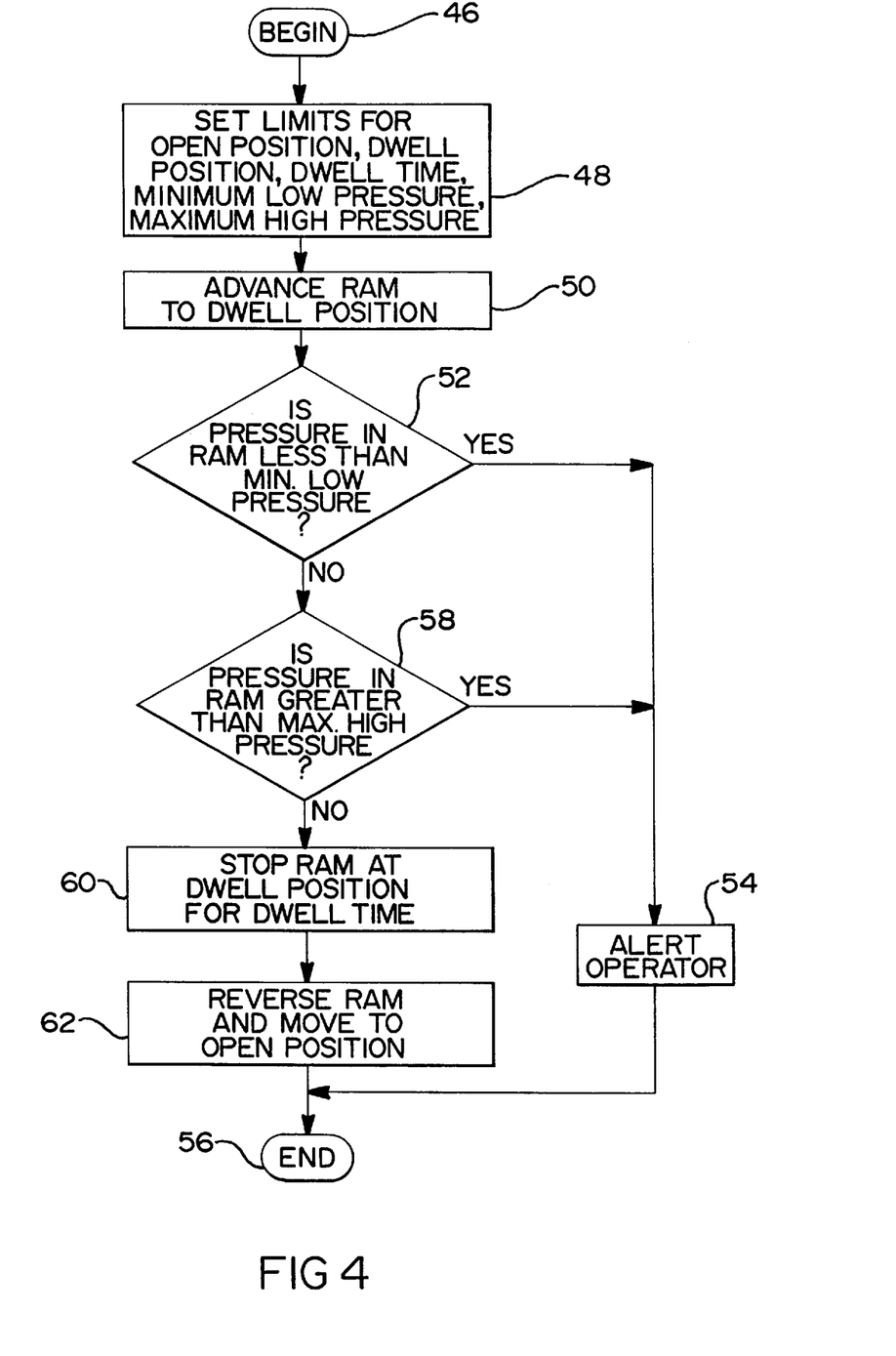
FIG. 4 is a flowchart of a method of controlling a crimp press for crimping an assembly, according to the present invention, such as the hose assembly of FIG. 2.

Referring to FIG. 4, one embodiment of a method of controlling the crimp press 10 for crimping an assembly, as such the hose assembly 11, according to the present invention, is shown. The method begins in bubble 46 and advances to block 48. In block 48, the method includes the step of setting predetermined limits for an open position for when the piston of the ram 26 is retracted away from the bed 24, a dwell position for when the piston of the ram 26 is advanced toward the bed 24, a dwell time for dwelling at the dwell position, a minimum or low fluid pressure of the ram 26 and a maximum or high fluid pressure of the ram 26. An assembly, such as the hose assembly 11, is placed in the lower die 36 of the open crimp die 32 of the crimp press 10. It should be appreciated that the positions are in inches, time in seconds and pressure in pounds per square inch and that suitable metric equivalents may be used. It should also be appreciated that the predetermined limits are programmed into the electronic control system 30 by an operator via the remote keypad and readout.

From block 48, the method advances to block 50 and includes the step of advancing the ram 26 from the open position toward the predetermined dwell position to close the crimp die 32. With the crimp press 10 in an idle state to be described, the electronic control system 30 energizes various solenoids of the solenoid-actuated valves to direct delivery of hydraulic fluid from the pump to a head end of the hydraulic cylinder 27 to advance the rod 28 of the ram 26 at a rapid speed such as two hundred twelve (212) I.P.M. followed by a pressing speed such as seventy-nine (79) I.P.M.

From block 50, the method determines whether the pressure in the ram 26 is within a predetermined pressure range. The method advances to diamond 52 and includes the step of determining whether the pressure in the ram 26 is less than a minimum or low fluid pressure such as one thousand (1000) psi. The pressure transducer 42 sends a signal of the fluid pressure in the ram 26 to the electronic control system 30. If so, the method advances to block 54 and includes the step of alerting the operator of the crimp press 10. The electronic control system 30 alerts the operator by illuminating an indicating light and sounding an audible alarm (not shown). From block 54, the method advances to bubble 56 and ends.

In diamond 52, if the pressure in the ram 26 is not less than the minimum or low fluid pressure, the method advances to diamond 58 and includes the step of determining whether pressure in the ram 26 is greater than the maximum or high fluid pressure such as one thousand eight hundred seventy-five (1875) psi. Preferably, the maximum or high fluid pressure is the same as the pressure for the hydraulic fluid system 28. If so, the method advances to block 54 previously described. If not, the method advances to block 60 and includes the step of stopping the ram 26 at the predetermined dwell position and dwelling or delaying for the predetermined dwell time such as two (2) seconds. After block 60, the method advances to block 62 and includes the step of reversing the ram 26 and moving the ram 26 to the open position to open the crimp die 32. The electronic control system 30 de-energizes the previously energized solenoids and energizes various solenoids of the solenoid-actuated valves to direct delivery of hydraulic fluid to a rod end of the hydraulic cylinder 27 to retract the ram 26 at a fast speed. The linear transducer 44 sends a signal of the open distance to the electronic control system 30 to alert the operator. The electronic control system 30 de-energizes the solenoids previously energized and the ram 26 stops. The crimp press 10 reverts to an idle state with the pump motor running and delivery of fluid from the pump returns through the fluid cooler to the fluid reservoir. After block 62, the method advances to bubble 56 and ends. It should be appreciated that the method is repeated for each assembly to be crimped.

Accordingly, the method of the present invention allows the operator to verify that every assembly meets the predetermined criteria for the crimp. For the example of the hose assembly 11, if the pressure in the ram 26 is outside the fluid pressure range such as 1500 psi±5 psi as indicated by the pressure transducer 42, the operator is alerted to reject the hose assembly 11. If the pressure in the ram 26 is within the fluid pressure range but the linear movement of the ram 26 is less or more than a predetermined range such as twelve inches±0.002 inches as indicated by the linear transducer 44, the operator is alerted to reject the hose assembly 11.

Figure 5:
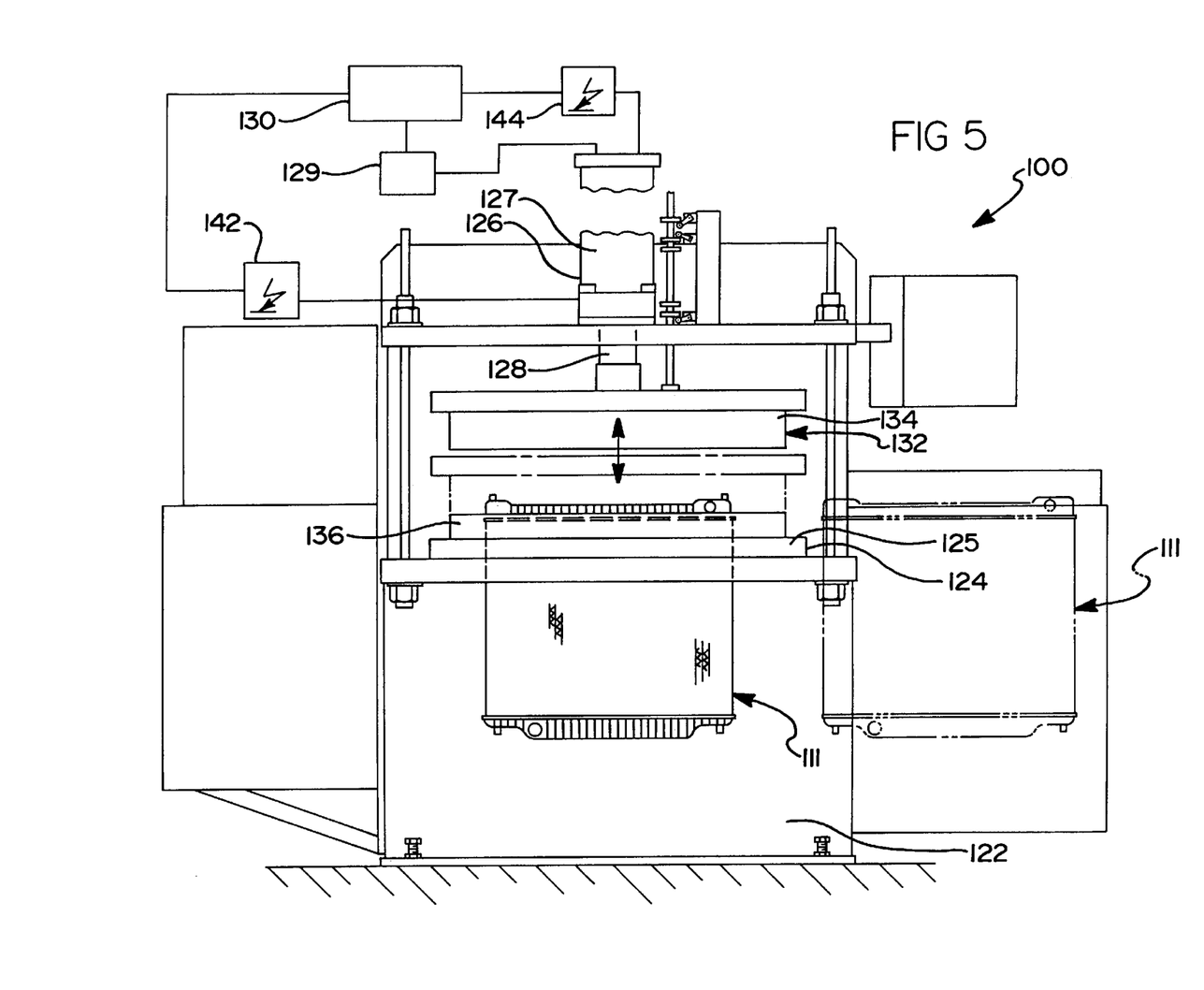
FIG. 5 is an elevational view of another crimp press.
Figure 6:
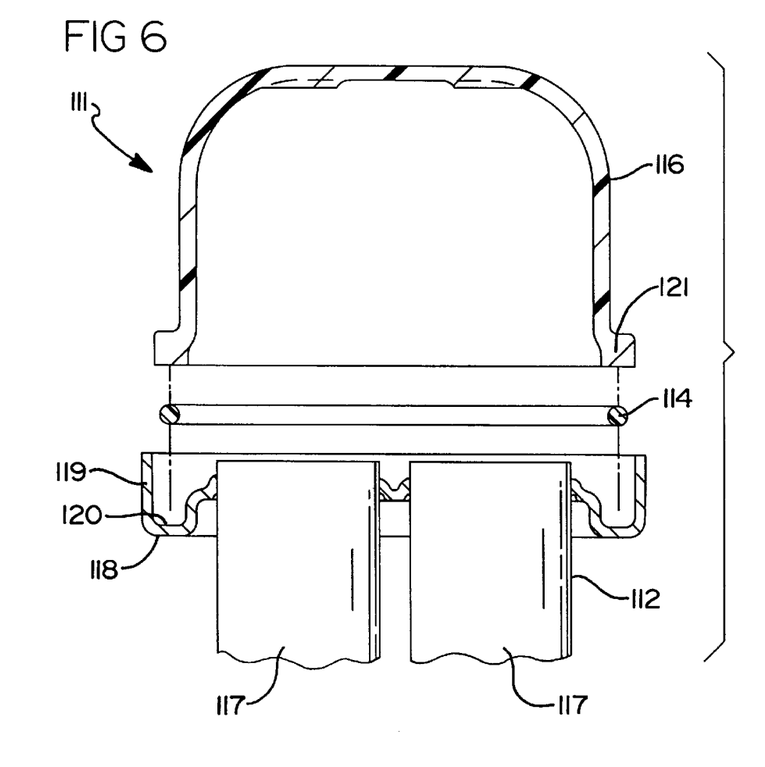
FIG. 6 is an exploded fragmentary view of an assembly such as a radiator assembly prior to crimping in the crimp press of FIG. 5.
Figure 7:
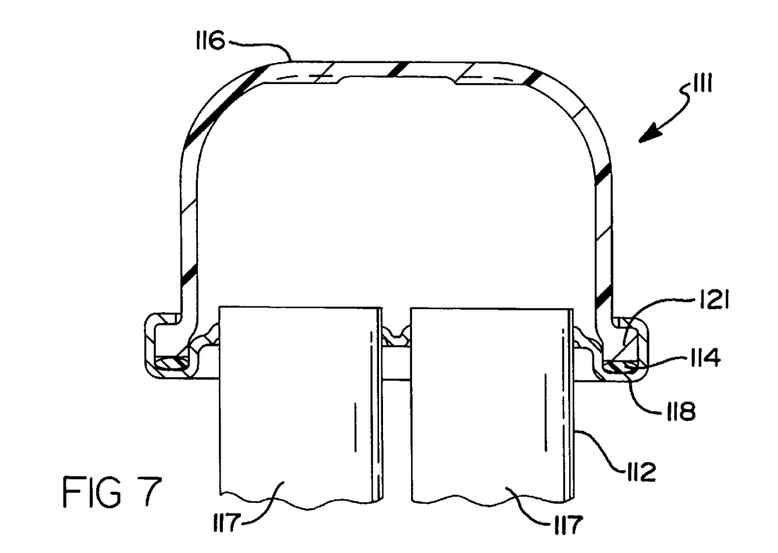
FIG. 7 is an elevational view of the radiator assembly after crimping in the crimp press of FIG. 5.

Referring to the drawings and in particular to FIG. 5, one embodiment of a crimp press 100 is shown for crimping an assembly, such as a radiator assembly, generally indicated at 111 in FIGS. 6 and 7. The radiator assembly 111, in this example, is used on a cooling system (not shown) of a motor vehicle (not shown).

Referring to FIGS. 6 and 7, the radiator assembly 111 includes a radiator core 112, seal 114 and a tank 116. The radiator core 112 is made of a rigid material such as metal, preferably aluminum or steel tubing, and has a plurality of generally cylindrical and axially projecting tubes 117 and a header 118 surrounding one end of the tubes 117 as is known in the art. The header 118 is also made of a rigid material such as metal, preferably aluminum or steel, and is generally a planar plate with at least one, preferably a plurality of tabs 119 generally perpendicular thereto to form a channel 120. The tank 116 is made of a rigid material such as plastic, preferably having a thickness of 0.058 inches. The tank 116 has a generally inverted U-shape in cross-section with a flange 121 extending generally perpendicular at one end thereof. The tank 116 is secured to the header 118 by folding the tabs 119 over the flange 121. The seal 114 is made of a flexible material such as an elastomer as is known in the art. The seal 114 is disposed in the channel 120 of the header 118 and underneath the flange 121 of the tank 116. It should be appreciated that the tabs 119 of the header 118 are crimped to create an interference fit between the header 118, seal 114 and tank 116. It should also be appreciated that the header 118, seal 114 and tank 116 may be made of various suitable wall thickness.

The crimp press 100 includes a frame 122, bed 124 and ram 126. The bed 124 includes a bed plate 125 having a generally rectangular shape. The bed plate 25 is rigid and connected to the frame 122 by suitable means to form the bed 124 of the crimp press 100. The ram 126 includes a hydraulic cylinder 127 having a reciprocating piston (not shown) therein and a rod 128 connected to the piston. The hydraulic cylinder 127 is positioned above the bed plate 125 and connected to the frame 122 by suitable means to form the ram 126 of the crimp press 100. It should be appreciated that the ram 126 is operated by fluid pressure to be described.

The crimp press 100 also includes a hydraulic fluid system 129 fluidly connected to the ram 126. The hydraulic fluid system 129 includes a motor, pump, fluid reservoir, fluid cooler, and a plurality of solenoid-actuated valves (not shown) for controlling the fluid flow and pressure to the ram 126. The crimp press 100 includes an electronic control system 130 electronically connected to the motor of the pump and the solenoids of the solenoid-actuated valves. The electronic control system 130 includes a controller, remote keypad and read-out (not shown). The electronic control system 130 and hydraulic fluid system 129 control the fluid pressure to the ram 126. For example, the fluid pressure to the ram 126 may be controlled to provide a rapid advance of approximately 250 inches per minute (I.P.M.) and a pressing advance of 80 I.P.M. and a return stroke of 250 I.P.M. Such a crimp press 100 is commercially available as a one hundred (100) ton "4 post" press from Ahaus of Richmond, Ind.

The crimp press 100 also includes a crimp die, generally indicated at 132, for crimping the radiator assembly 111. The crimp die 132 includes an upper die 134 connected to one end of the rod 128 and a lower die 136 connected to the bed plate 125. Such a crimp die is commercially available as a "Radiator Header To Tank" die from Ahaus of Richmond, Ind. When the crimp die 132 is open, the radiator assembly 111 is placed or removed in the lower die 136. The upper die 134 is moved by the ram 126 toward the lower die 136 to close the crimp die 132 and crimp the header 118, seal 114 and tank 116 of the radiator assembly 111 together as illustrated in FIG. 7. It should be appreciated that the crimp die 132 may have any suitable type of crimp for crimping the radiator assembly 111. It should also be appreciated that up to this point in the description, the crimp press 100 is conventional and known in the art.

The crimp press 100 further includes a pressure sensor or transducer 142 connected to the ram 126 and the electronic control system 130. The pressure transducer 142 senses or measures the fluid pressure in the ram 126 and sends a corresponding signal to the electronic control system 130. Such a pressure transducer 142 is commercially available from Dynisco of Sharon, Mass. The crimp press 100 also includes a linear sensor or transducer 144 connected to the ram 126 and the electronic control system 130. The linear transducer 144 senses or measures the linear distance of the ram 126 and sends a corresponding signal to the electronic control system 130. Such a linear transducer 134 is commercially available from Templesonics of Triangle Park, N.C. It should be appreciated that the pressure transducer 142 monitors the fluid pressure of the ram 126 and that the linear transducer 144 monitors the linear movement of the piston of the ram 126.

Figure 8:
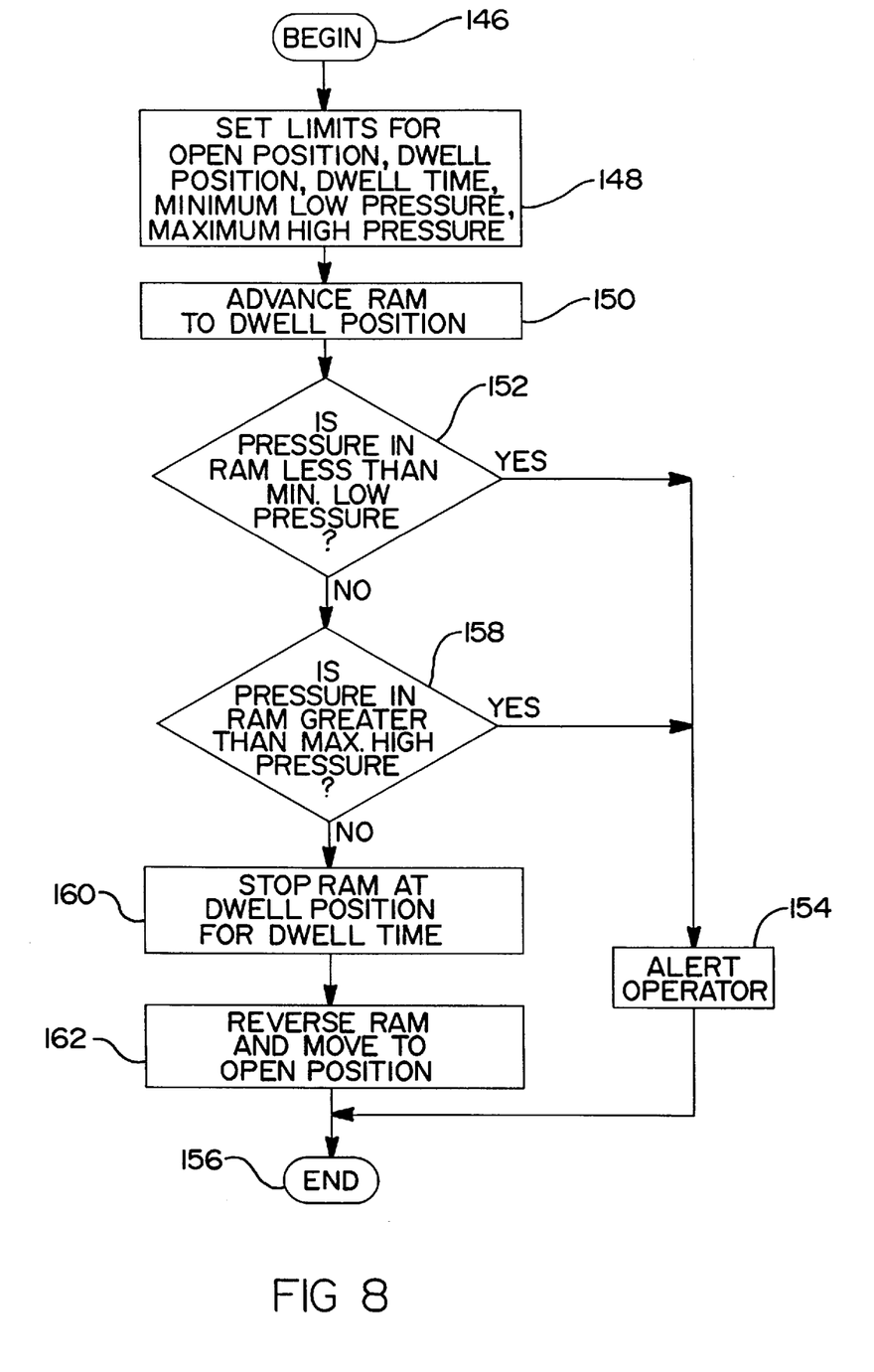
FIG. 8 is a flowchart of a method of controlling a crimp press for crimping an assembly, according to the present invention, such as the radiator assembly of FIG. 6.

Referring to FIG. 4, one embodiment of a method of controlling the crimp press 100 for crimping an assembly, as such the radiator assembly 111, according to the present invention, is shown. The method begins in bubble 146 and advances to block 148. In block 148, the method includes the step of setting predetermined limits for an open position for when the piston of the ram 126 is retracted away from the bed 124, a dwell position for when the piston of the ram 126 is advanced toward the bed 124, a dwell time for dwelling at the dwell position, a minimum or low fluid pressure of the ram 126 and a maximum or high fluid pressure of the ram 126. An assembly, such as the radiator assembly 111 is placed in the lower die 136 of the open crimp die 132 of the crimp press 100. It should be appreciated that the positions are in inches, time in seconds and pressure in pounds per square inch and that suitable metric equivalents may be used. It should also be appreciated that the predetermined limits are programmed into the electronic control system 130 by an operator via the remote keypad and readout.

From block 148, the method advances to block 150 and includes the step of advancing the ram 126 from the open position toward the predetermined dwell position to close the crimp die 132. With the crimp press 100 in an idle state to be described, the electronic control system 130 energizes various solenoids of the solenoid-actuated valves to direct delivery of hydraulic fluid from the pump to a head end of the hydraulic cylinder 127 to advance the rod 128 of the ram 126 at a rapid speed such as 250 I.P.M. followed by a pressing speed such as 80 I.P.M.

From block 150, the method determines whether the pressure in the ram 126 is within a predetermined pressure range. The method advances to diamond 152 and includes the step of determining whether the pressure in the ram 126 is less than a minimum or low fluid pressure such as 1200 psi. The pressure transducer 142 sends a signal of the fluid pressure in the ram 126 to the electronic control system 130. If so, the method advances to block 154 and includes the step of alerting the operator of the crimp press 100. The electronic control system 130 alerts the operator by illuminating an indicating light and sounding an audible alarm (not shown). From block 154, the method advances to bubble 156 and ends.

In diamond 152, if the pressure in the ram 126 is not less than the minimum or low fluid pressure, the method advances to diamond 158 and includes the step of determining whether pressure in the ram 126 is greater than the maximum or high fluid pressure such as 2000 psi. Preferably, the maximum or high fluid pressure is the same as the pressure for the hydraulic fluid system 129. If so, the method advances to block 154 previously described. If not, the method advances to block 160 and includes the step of stopping the ram 126 at the predetermined dwell position and dwelling or delaying for the predetermined dwell time such as 1.5 seconds. After block 160, the method advances to block 162 and includes the step of reversing the ram 126 and moving the ram 126 to the open position to open the crimp die 132. The electronic control system 130 de-energizes the previously energized solenoids and energizes various solenoids of the solenoid-actuated valves to direct delivery of hydraulic fluid to a rod end of the hydraulic cylinder 127 to retract the ram 126 at a fast speed. The linear transducer 144 sends a signal of the open distance to the electronic control system 130 to alert the operator. The electronic control system 130 de-energizes the solenoids previously energized and the ram 126 stops. The crimp press 100 reverts to an idle state with the pump motor running and delivery of fluid from the pump returns through the fluid cooler to the fluid reservoir. After block 162, the method advances to bubble 156 and ends. It should be appreciated that the method is repeated for each radiator assembly 111 to be crimped.

Accordingly, the method of the present invention allows the operator to verify that every assembly meets the predetermined criteria for the crimp. For the example of the radiator assembly 111, if the pressure in the ram 126 is outside the fluid pressure range such as 1800 psi±5 psi as indicated by the pressure transducer 142, the operator is alerted to reject the radiator assembly 111. If the pressure in the ram 126 is within the fluid pressure range but the linear movement of the ram 126 is less or more than a predetermined range such as 14 inches±0.002 inches as indicated by the linear transducer 144, the operator is alerted to reject the radiator assembly 111.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of controlling a crimp press for crimping an assembly, said method comprising the steps of:

placing an assembly in an open crimp die of a crimp press;

advancing a ram of the crimp press to a predetermined position to close the crimp die;

determining whether a pressure in the ram is within a predetermined pressure range; and alerting an operator if the pressure in the ram is not within the predetermined pressure range.

2. A method as set forth in claim 1 including the step of stopping the ram at the predetermined position if the pressure in the ram is within the predetermined pressure range.

3. A method as set forth in claim 2 including the step of delaying for a predetermined time at the predetermined position.

4. A method as set forth in claim 3 including the step of reversing and moving the ram to open the crimp die.

5. A method as set forth in claim 1 wherein said step of advancing comprises moving a ram with an upper die of the crimp die toward a lower die of the crimp die to a dwell position to close the crimp die.

6. A method as set forth in claim 1 wherein said step of determining comprises determining whether the pressure in the ram is less than a minimum fluid pressure and determining whether the pressure in the ram is greater than a maximum fluid pressure.

7. A method as set forth in claim 6 including the step of setting predetermined limits for the minimum fluid pressure and maximum fluid pressure.

8. A method as set forth in claim 1 wherein said step of alerting comprises alerting an operator by illuminating an indicating light and sounding an audible alarm.

9. A method of controlling a crimp press for crimping an assembly, said method comprising the steps of:

placing an assembly in an open crimp die of a crimp press;

advancing a ram of the crimp press to a predetermined position to close the crimp die;

determining whether a fluid pressure in the ram is less than a minimum fluid pressure and determining whether the fluid pressure in the ram is greater than a maximum fluid pressure;

alerting an operator if the pressure in the ram is less than the minimum fluid pressure or greater than the maximum fluid pressure; and stopping the ram at the predetermined position if the fluid pressure in the ram is not greater than the maximum fluid pressure.

10. A method as set forth in claim 9 including the step of delaying for a predetermined time at the predetermined position.

11. A method as set forth in claim 10 including the step of reversing and moving the ram to open the crimp die.

12. A method as set forth in claim 10 wherein said step of advancing comprises moving a ram with an upper die of the crimp die toward a lower die of the crimp die to a dwell position to close the crimp die.

13. A method as set forth in claim 10 wherein said step of alerting comprises alerting an operator by illuminating an indicating light and sounding an audible alarm.

14. A method as set forth in claim 10 including the step of setting predetermined limits for the minimum fluid pressure and maximum fluid pressure.

15. A method of controlling a crimp press for crimping a tank to a header of a radiator assembly, said method comprising the steps of:

setting predetermined limits for a minimum fluid pressure and a maximum fluid pressure of a ram of a crimp press;

moving the assembly in an open crimp die of the crimp press;

advancing the ram of the crimp press to a predetermined position to close the crimp die;

determining whether the fluid pressure in the ram is less than the minimum fluid pressure and determining whether the pressure in the ram is greater than the maximum fluid pressure;

alerting an operator if the pressure in the ram is less than the minimum fluid pressure and greater than the maximum fluid pressure;

stopping the ram at the predetermined position if the fluid pressure in the ram is not greater than the maximum fluid;

delaying for a predetermined time at the predetermined position; and reversing and moving the ram to open the crimp die.

16. A method as set forth in claim 15 wherein said step of advancing comprises moving the ram with an upper die of the crimp die toward a lower die of the crimp die to a dwell position to close the crimp die.

17. A method as set forth in claim 15 wherein said step of alerting comprises alerting an operator by illuminating an indicating light and sounding an audible alarm.

* * * * *